E. O. THOMPSON.
Tailor's Measuring Tool.
No. 200,779. Patented Feb. 26, 1878.
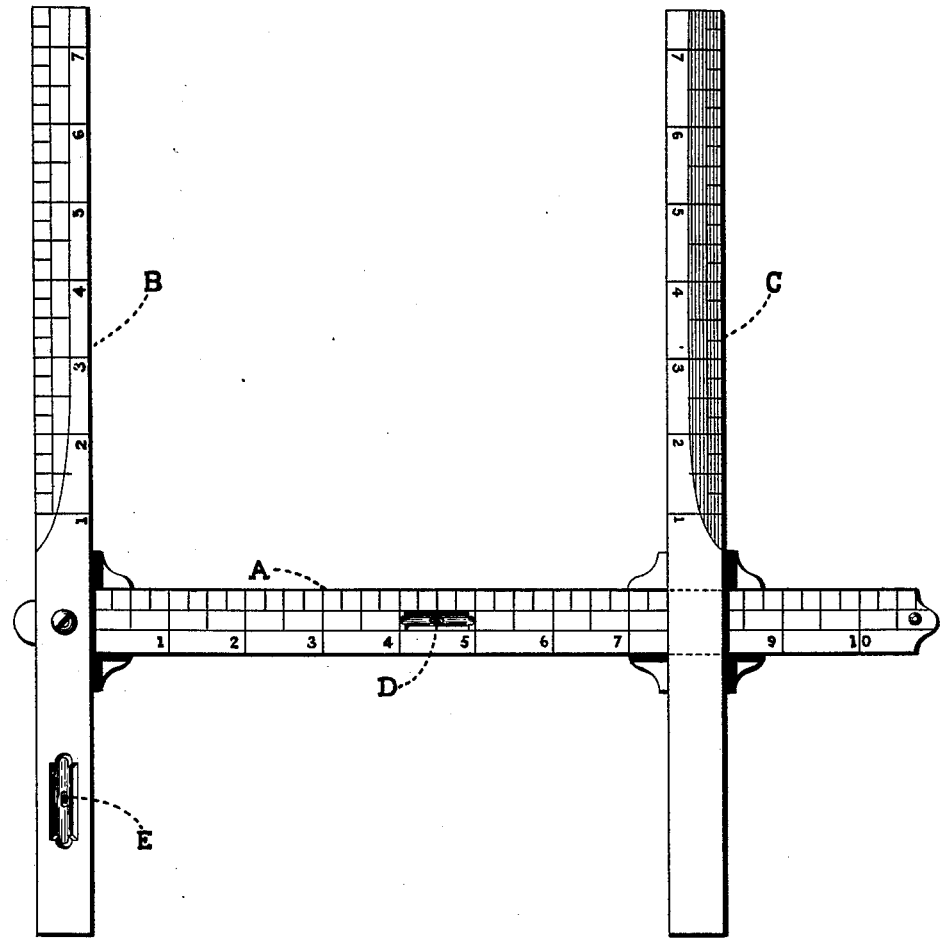
WITNESSES
Sam. P. Hanson
A. H. Nichols
Ephraim O. Thompson INVENTOR
per
G. Morgan Eldridge ATTORNEY

UNITED STATES PATENT OFFICE.

ETHAN O. THOMPSON, OF PHILADELPHIA, PENNSYLVANIA.

IMPROVEMENT IN TAILORS' MEASURING-TOOLS.

Specification forming part of Letters Patent No. 200,779, dated February 26, 1878; application filed October 5, 1877.

*To all whom it may concern:*

Be it known that I, ETHAN OSBORN THOMPSON, of Philadelphia, in the State of Pennsylvania, have invented a new and useful Improvement in Tailors' Measuring-Tools, which improvement is fully set forth in the following specification, reference being had to the accompanying drawings.

My invention relates to an improvement in tailors' measuring-tools; and it consists in an instrument by which the horizontal through measures, as well as all other straight measures of the human body or other figure, can be readily and accurately determined.

This instrument consists of a rigid bar, A, to which are attached at right angles two parallel arms, B C, projecting on one side a sufficient distance to measure any object desired, and on the other side extending into rigid handles, by which the instrument is conveniently manipulated. One of these arms is firmly fastened to the bar A, and the other slides upon the bar, so that the two arms can be brought close together or moved apart to the length of the bar, remaining always parallel.

The fastening between the arm and the bar is made detachable, for convenience of packing and transportation; or the instrument may be so constructed that both the arms may be movable, or either, at pleasure.

Upon each or upon either of the arms, as well as upon the bar, proper measures are inscribed.

In the bar, and in one or both of the arms, in the direction of their length, are inserted spirit or other levels D E, so that the instrument may be brought to a true horizontal position; or both these levels may be inserted in the bar or in the arm.

In the drafting, cutting, and fitting of garments for the human figure it is important to have accurate horizontal through measures of the same in all directions, as well that the garment may be made properly to fit the figure as that irregularities of form, whether of body or limb, which are incident to all such figures, may be detected, accurately measured, and duly allowed for. It is evident that by this instrument this object can be entirely attained, and so not only with the human figure, but with any other object which it is desired thus to measure.

I claim as my invention—

1. In combination with the rigid bar A, the arms B C, having rigid handle-extensions, and operating substantially as and for the purpose described.

2. In combination with the rigid bar A and arms B C, having handle-extensions, the levels D E, substantially as and for the purpose described.

ETHAN O. THOMPSON.

Witnesses:
WM. H. MYERS,
THOMAS ROBINS, 3d.